United States Patent Office 3,634,535
Patented Jan. 11, 1972

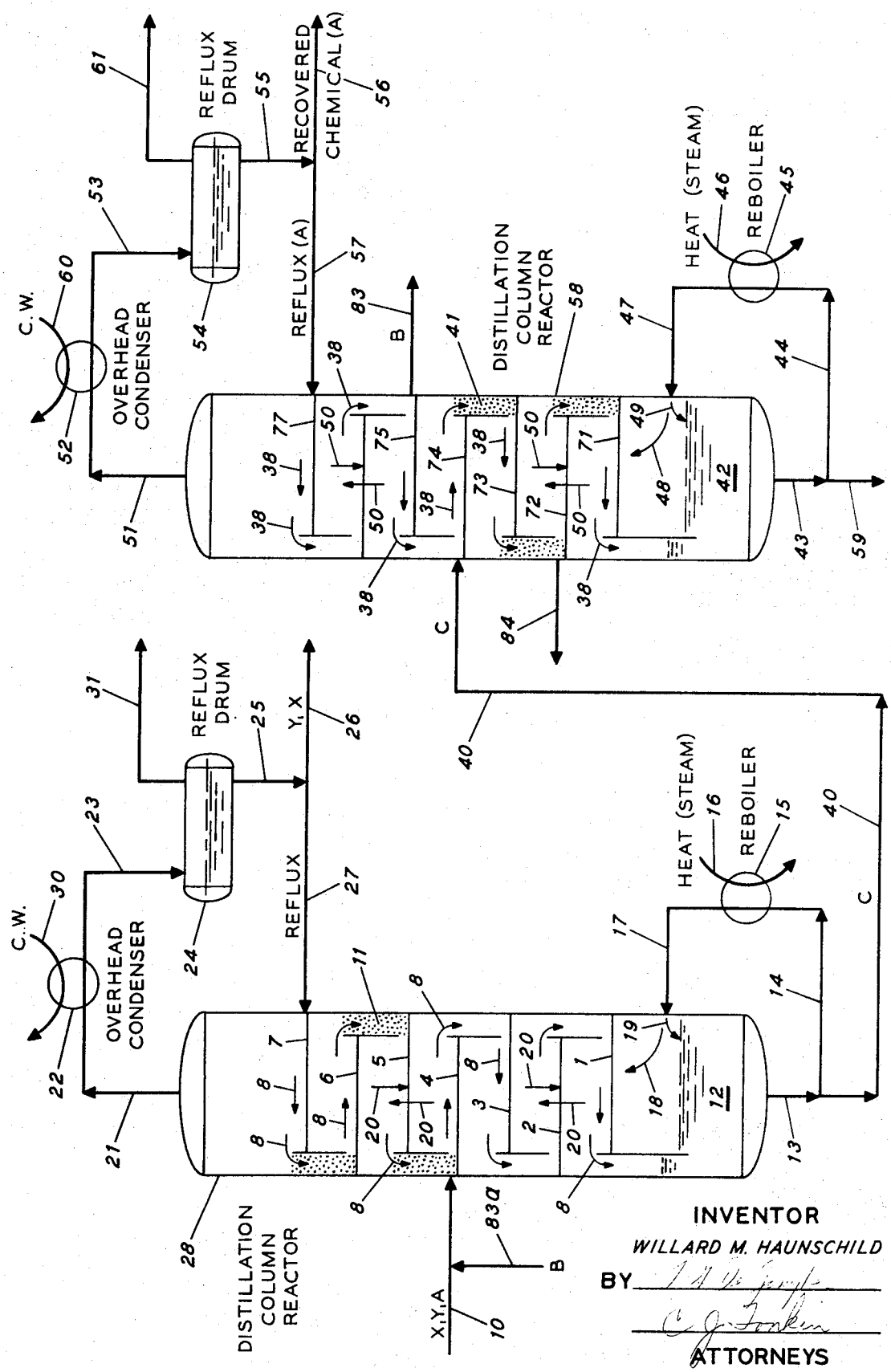

3,634,535
SEPARATION AND CATALYSIS
Willard M. Haunschild, Walnut Creek, Calif., assignor to Chevron Research Company, San Francisco, Calif.
Filed Aug. 22, 1969, Ser. No. 852,270
Int. Cl. C07c 11/12
U.S. Cl. 260—677 A    7 Claims

ABSTRACT OF THE DISCLOSURE

A process for separating a first chemical from a mixture of chemicals using two distillation column reactors in series. In the first distillation column reactor the first chemical undergoes a reaction to form a second chemical which is easily fractionated from the mixture of chemicals. This second chemical is then fed to the second distillation column reactor, where the reaction is reversed and the first chemical is recovered by fractionation.

BACKGROUND OF THE INVENTION

Field of the invention

The present invention relates to the separation of a chemical compound or element from a mixture of chemicals. The present invention also relates to heterogeneous catalysis. More particularly, the present invention relates to the use of simultaneous distillation and catalysis in a process for the separation of a particular chemical from a mixture of chemicals.

Description of the prior art

Much of the prior art with respect to distillation and heterogeneous catalysis is discussed in my patent application, Ser. No. 852,269 titled "Distillation of Volatile Reactants and Heterogeneous Catalysis" filed on or about Aug. 22, 1969, the disclosure of which application is hereby incorporated by reference in its entirety into the present application.

U.S. Pat 3,170,000 discloses a process for the separation or recovery of a $C_4$ to $C_7$ tertiary olefin from a mixture of the olefin with hydrocarbons of about the same boiling range by selectively converting the tertiary olefin to a tertiary ether and separating and decomposing the ether preferably in the vapor phase. The disclosure of U.S. Pat. 3,170,000 is hereby incorporated by reference in its entirety into the present patent application.

According to the process disclosed in U.S. Pat. 3,170,-000, the tertiary olefin contained in a mixed hydrocarbon stream is caused to selectively react with a lower aliphatic primary alcohol of up to about 6 carbon atoms, and the resulting tertiary ether product is decomposed by contact with a low-area solid weakly acid-acting metal oxide catalyst at elevated temperatures. The etherification temperature range is about 100 to 350° F. The decomposition of the tertiary ether is performed at a temperature range of about 350 to 1,000° F., preferably about 600 to 900° F. The tertiary ether is passed generally in the vapor phase over the weakly acid-acting metal oxide catalyst, to form the initial tertiary olefin and alcohol. The product of the ether decomposition reaction is then washed free of alcohol with cold water and distilled to give the regenerated tertiary olefin.

In this specification, the term "tertiary olefin" means an olefin containing a carbon atom bonded to three other carbon atoms and connected to one of these carbon atoms by a double bond.

U.S. Pat. 3,121,124 discloses a similar process for the recovery of a tertiary olefin from a mixture of the olefin with hydrocarbons of about the same boiling range by selectively converting the tertiary olefin to a tertiary ether and separating and then decomposing the ether. The disclosure of U.S. Pat. 3,121,124 is hereby incorporated by reference in its entirety into the present patent application.

According to the process disclosed in U.S. Pat. 3,121,-124, the decomposition of the tertiary ether to tertiary olefin and alcohol is performed in a temperature range of 100 to 400° F. in the presence of a strong acid catalyst (as opposed to a weakly acid-acting metal oxide catalyst as disclosed in U.S. Pat. 3,170,000).

Neither U.S. Pat. 3,170,000 nor U.S. Pat. 3,121,124 discloses carrying out the recovery process in a distillation column reactor.

SUMMARY OF THE INVENTION

According to the present invention a process is provided for separating a first chemical from a mixture of chemicals, which process comprises:

(a) Feeding the mixture to a feed zone of a first distillation column reactor containing a first heterogeneous catalyst effective to catalyze the reaction of the first chemical to form a second chemical;

(b) Contacting the first chemical with the first heterogeneous catalyst contained in the first distillation column reactor and forming the second chemical while simultaneously fractionating unreacted portions of the first chemical away from the second chemical;

(c) Removing the formed second chemical from the first distillation column reactor;

(d) Feeding the formed second chemical to a second distillation column reactor containing a second heterogeneous catalyst effective to catalyze the reaction of the formed second chemical to the first chemical;

(e) Contacting the second chemical with the second heterogeneous catalyst contained in the second distillation column reactor and forming the first chemical while simultaneously fractionating unreacted portions of the second chemical away from the first chemical;

(f) Removing the first chemical from the second distillation column reactor.

The use of the distillation reactor is particularly advantageous for equilibrium limited reactions, as the distillation column reactor can be used to distill away from the reactants the products of the reaction.

By an equilibrium-limited reaction is meant a reaction which is reversible and which reaches a point where there is no further net formation of product, because the rates of forward and reverse reactions are equal.

For a reaction such as $$A + B \rightleftharpoons C$$

The forward reaction rate may be written for a second-order reaction as follows:

$$\frac{d[A]}{dt} = k_1 [A][B]$$

or $$R_1 = k_1 [A][B]$$

and the reverse reaction rate may be written (assuming first order reverse reaction):

$$R_2 = k_2 [C]$$

In the above equation the brackets denote the concentration of a given material, $t$ is the time, $d[A]/dt$ is the rate at which the concentration of A changes with time and $k$ is the constant known as the specific reaction-rate constant or velocity constant. Not all reactions follow the Guldberg-Waage type rate expressions as above, but a 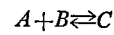 large number of reactions do, and the above type rate expressions are generally good for qualitative understanding of the effect of change in concentration of reactants or products in an overall reaction.

The determination of whether a given reaction is a first order, second order or some other order is by experiment.

A particular reaction of the type $A+B \rightleftharpoons C$ is the following etheration reaction, indicated schematically, with hydrogen shown omitted:

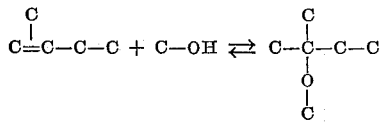

This reaction of a tertiary olefin with methanol to form an ether is preferably carried out over an acidic catalyst. Sulfonated resin type catalysts such as disclosed in U.S. Pat. 3,170,000 are suitable for the etheration reaction. Other catalysts such as disclosed in U.S. Pat. 3,170,000 and U.S. Pat. 3,121,124 are suitable for etheration and decomposition of ethers.

The overall process of the present invention may be visualized by considering a mixture of chemicals comprised of hypothetical components X, Y, and A. It is to be understood that the term "chemical" is used herein to mean a chemical which is liquefiable and reactive and thus succeptible to simultaneous distillation and catalyzed reaction with other chemicals. It is desired to separate A from X and Y, but this separation may be difficult, as, for example, due to the low relative volatility of A to X or Y, or due to the fact that azeotropes are formed in the distillation, or etc. According to the process of the present invention, chemical A contained in the mixture is reacted with B to form a new chemical C. The new chemical C is relatively easy to separate from constituents X and Y by distillation. This distillation is carried out in a first distillation column reactor with the advantage that the distillation continually is fractionating component C away from reactants A and B, as well as away from components X and Y. Because C is fractionated away from reactants A and B, *the net reaction rate* of A and B to form C is increased, i.e., equilibrium limitations are removed and the reaction can proceed toward completion. The formed chemical C is removed, for example, from the bottom of the first distillation column, and components X and Y and excess B are removed, for example, from the top of the distillation column, reactant A and B having been consumed by a combination to form C. The newly formed C is then removed from the first distillation column reactor and passed to a second distillation column reactor wherein it undergoes the catalyzed reaction of $C \rightarrow A+B$. Component B is typically chosen to be easily separated from chemical A so that chemical A may be obtained as a pure product from the second distillation column, as, for example, by distilling chemical A overhead or, for example, water washing in the second distillation column and removing B from the side or bottom of the second distillation column for recycle back to the first distillation column.

In the process of the present invention it is preferable that the heterogeneous catalyst is located in the upper part of the first distillation column, that is, above the feed zone of the first distillation column, and in the second column is primarily located below the feed zone of the second distillation column. Thus, for the hypothetical reaction $A+B \rightarrow C$ the mixture of chemicals containing A is fed to the first distillation column, together with reactant B, and the reactants A and B are fractionated upward in the column for contact with the catalyst so as to form chemical C. Because C is fractionated downward in the column, the catalyst located above the feed zone in the first distillation column will be positioned to contact reactants A and B at positions in the first distillation column where the liquid and vapor are relatively lean in chemical C. The lower part of the distillation column, that is, below the feed zone of the first distillation column, is relatively concentrated in component C, but contains no catalyst which would catalyze the undesirable decomposition of C to A and B.

C is removed from the bottom of the first distillation column and fed to the second distillation column, which contains catalyst below the feed zone. This catalyst is thus positioned so that it will contact C in relatively high concentrations with respect to components A and B.

As A is formed due to the decomposition reaction, A travels upward as a vapor in the distillation column because it is more volatile than C. Thus, A is continually removed as an upwardly flowing vapor from the lower part of the distillation column so that the net rate of the forward reaction $C \rightarrow A+B$ is greater than the reverse reaction $A+B \rightarrow C$ in the lower part o the distillation column.

Component B may be recovered from A and recycled to the first distillation column. Component B will generally contain some A and C also, but since the withdrawal stream is recycled, it is only important that this withdrawal stream be relatively rich in B with respect to A and C.

An advantage of the present invention is that the same catalyst may be used for both the forward and reverse reactions and *at approximately (within 0 to 100°F.) the same low reaction temperature,* thus avoiding heating to elevated temperatures to obtain decomposition. This is a result of the use of the distillation column in conjunction with the catalyzed reactions. In the first distillation column C is selectively fractionated away from the zone which contains the catalyst, and thus the net rate of the reaction $A+B \rightarrow C$ is relatively fast.

It is a principle of catalysis that a given catalyst accelerates the forward and reverse reaction rates by the same amount, so that equilibrium is more quickly achieved, but the equilibrium composition is not changed. Thus, it has been determined that the process of the present invention is preferably applied to those equilibrium limited reactions which are limited to a yield of between 2 and 90 percent based on the chemical A which is desired to be separated from the feed mixture. If a given chemical which is desired to be separated from a feed reactant (B) to give a yield higher than about 90% before the reaction is equilibrium-limited, then it is generally preferred to use a distillation column reactor only for the decomposition and use a traditional type reactor for the combination reaction.

The etheration reaction such as indicated previously in simplified form is a typical equilibrium-limited reaction. For example, at temperatures in the range 125–200° F., unfavorable equilibrium limits to about 50% yield the combination reaction of tertiary olefins such as 2-methyl butene-2 and 2-methyl pentene-2 with methanol to form ethers.

In the present invention the distillation columns may employ bubble cap or sieve trays such as are well known in the fractionation art. Catalyst may be positioned on the trays or at various separate zones in the distillation column or in the downcomers from at least several of the trays in the column.

An important aspect of the present invention is that the heterogeneous catalyst is placed at separate zones along the vertical axis of the distillation columns so that a relatively small amount of catalyst will restore the overall reaction approximately to equilibrium after each separation stage or significant amount of separation resulting from the distillation. The separate masses usually consist of about one to 20 cubic feet (superficial volume) of catalyst particles. In certain large scale processes, for example in engine fuel production, the separate masses may consist of up to about 50 or 100 cubic feet of catalyst particles.

As is well known in the fractionation art, the various substances which are fractionated in the distillation column assume a concentration profile with respect to the length of the column at steady state conditions for a given temperature, pressure and feed composition to the column. The concentration profile depends on the relative volatility of the various components being fractionated in the distillation column. Those substances having a high relative volatility are most concentrated in the upper parts of the column, and those substances having a low relative volatility are most concentrated in the lower parts of the column.

For addition type reaction such as $A+B \rightarrow C$, it is preferable to have the catalyst located in the upper part of the distillation column reactor, i.e., above the feed inlet. For the decomposition type reactions carried out in the second distillation column reactor, as, for example, $C \rightarrow A+B$, it is preferable to have the catalyst located in the lower part of the distillation column reactor.

Although the process of the present invention may be advantageously carried out using distillation column reactors wherein the distillation columns are comprised of bubble cap trays or sieve trays, there are a number of other suitable means which are preferable in certain processing situations. For example, valve trays may be used in the distillation columns. Also, to provide vapor-liquid contact surface, the distillation columns may contain "packing" such as is commonly used in certain gas scrubbing operations and in fractionation operations. When using packing material such as Raschig rings, Intalox-saddles, etc., the packing material is preferably loaded into the columns in layers with catalyst between the layers. Other particularly preferred means of providing separate zones of catalyst for a distillation column type reactor are discussed in my application Ser. No. 852,269 titled "Distillation of Volatile Reactants and Heterogeneous Catalysts" filed on or about Aug. 22, 1969.

The process of the present invention is advantageously used in conjunction with a catalytic cracking unit, such as a fluid catalytic cracking unit, to obtain a high purity stream of tertiary olefins such as isobutylene or tertiary pentenes. Typically, in a catalytic cracking unit, a light gasoline fraction is produced by de-ethanizing, depropanizing, and debutanizing the $C_2$ to 300° F. boiling range fraction to thus obtain a $C_5$ to 300° F. boiling range gasoline fraction. In many instances it would be desirable to separate various $C_5$ components from the gasoline particularly the tertiary pentene components so that they may be selectively used as high octane gasoline blending components or used as pure chemicals for other processing. However, if the $C_5$'s are fractionated from the gasoline by depentenizing the gasoline in a fractionating column, the mixture of $C_5$'s which is obtained boils in a relatively narrow boiling range, and it is difficult to separate the various tertiary pentenes from the other $C_5$ hydrocarbons by normal physical separation methods. The process of the present invention has been determined to be advantageous for effecting the separation of tertiary pentenes from a $C_5$ cut containing tertiary pentenes along with other $C_5$ hydrocarbons.

Among the factors which are important in achieving the separation of the tertiary pentenes are the following:

(1) The tertiary olefins react rapidly and selectively with alcohols, for example $C_1$ to $C_5$ alcohols, to produce tertiary ethers, whereas the linear olefins are essentially completely unreactive with the alcohol.

(2) The tertiary ethers are relatively easy to fractionate from the unreacted hydrocarbons, including the unreacted alcohol.

(3) The distillation column reactor used in accordance with the present invention increases the rate of reaction of the tertiary olefins with alcohols to form tertiary ethers not only due to the heterogeneous catalyst present but also because the product ether is constantly being removed from the reactant tertiary olefins and alcohols.

(4) The teritary ether which is removed from the first distillation column reactor is decomposed at a rapid rate in a second distillation reactor wherein selectively positioned catalyst facilitates a fast decomposition reaction to form the desired tertiary olefin. The tertiary olefin is constantly removed from the catalytic zone of ether decomposition in the second distillation column reactor so that the net decomposition reaction rate is improved while simultaneously recovering relatively pure tertiary pentene from the second distillation column reactor.

(5) Temperature can be adjusted to the desired level in the distillation column reactor by adjusting pressure. Typically the temperatures employed for the forward and reverse reactions are in the same range, so that high temperatures are not required for the decomposition reaction.

(6) With the ion exchange type catalysts which are typically used to catalyze the forward and reverse reactions there are essentially no side reactions such as polymerization.

The process of the present invention is also particularly advantageously applied to the separation of isobutylene from other hydrocarbons by reacting the isobutylene with propanol to form an ether, separating the ether and then decomposing the ether and separating isobutylene from propane. This reaction is equilibrium limited to about 50% yield in one stage or reaction. Because equilibrium limits the reaction to about 50% conversion in one stage, it is particularly advantageous to apply two distillation column reactors in series to obtain a relatively pure stream of isobutylene. This is accomplished by first reacting the isobutylene with propanol to form an ether. The ether is easily separated from the various other hydrocarbons, particularly the $C_4$'s which boil close to isobutylene. In a second distillation column reactor the separated ether is decomposed to obtain isobutylene which can be easily fractionated from the other decomposition product, that is, propanol.

This method of obtaining a pure stream of isobutylene can be applied to a $C_4$ cut hydrocarbon feed for a polybutene plant. Because isobutylene is difficult to separate from other $C_4$ hydrocarbons, in the past usually a $C_4$ cut containing isobutylene together with substantial amounts of other $C_4$ hydrocarbons has been fed to a polybutene plant, wherein most of the isobutylene is polymerized to make high molecular weight polybutenes. If an increased purity isobutylene stream is fed to a polybutene plant, a greater production rate can be obtained for a given size of the equipment in the plant.

Alternatively, the process of the present invention can be used to recover isobutylene from a polybutene plant effluent stream so that isobutylene can be recycled as feed for the polybutene plant to thereby increase polybutene production. For a large polybutene plant the polybutene production can be increased in this manner by about 10 million pounds per year.

Although it is preferred to use two distillation column reactors in series to recover isobutylene in accordance with the addition and decomposition reactions involving propanol, it usually is not preferred to use two distillation column reactors in series when methanol is used instead of propanol. For the reaction isobutylene plus methanol going to an ether, about 90 to 95 percent completion can be obtained in one stage of reaction at moderate temperatures. Because of this relatively high equilibrium yield in one stage of reaction, it is usually not economically attractive to use a distillation column reactor for the addition reaction. However, it is preferred to use a distillation column reactor for the decomposition reaction of the ether going to isobutylene plus methanol, because this reaction is equilibrium limited at a fairly low percentage decomposition. Thus, when isobutylene is desired to be recovered as a pure stream by the addition and decomposition reactions involving methanol, it is preferred to first react the isobutylene with methanol in a traditional type reactor to form an ether. The ether is then easily fractionated from the other hydrocarbons (generally having 4 or possibly 5 carbon atoms) and then the ether rich stream is fed to a distillation column reactor containing heterogeneous catalyst located in the lower part of the distillation column reactor. The ether is catalytically decomposed as it travels downwardly in the distillation column reactor, contacting the catalytic masses. The resultant isobutylene is fractionated upwardly in the distillation column reactor so that the decomposition reaction is not stopped by the equilibrium limitation. A methanol rich stream is removed from the bottom of the distillation column reactor for recycle as feed methanol for the addition reaction with the feed containing isobutylene.

BRIEF DESCRIPTION OF THE DRAWING

The drawing schematically illustrates a preferred process flow scheme and a preferred distillation column reactor as contemplated by the inventor for practice of the present invention.

DETAILED DESCRIPTION

Referring now in more detail to the drawing, a mixture of chemicals is introduced to distillation column reactor 28 via line 10. In the preferred embodiment illustrated the hypothetical reaction $A+B \rightarrow C$ is used, B being added to the mixture of chemicals fed to distillation column reactor 28. B is usually added in excess of that stoichiometrically required for complete reaction of A. In this illustration the nomenclature $A+B \rightarrow C$ is used for ease in following the explanation, but it is to be understood that numerous chemical reactions may follow the type of reaction illustrated, as for example the reaction of 2-methyl butene-2 with methanol to form methyl tertiary amyl ether.

Because individual reactants A and B are more volatile than product C, these reactants will tend to move upward in the distillation column and product C will tend to move downward. Preferably the initial part of the reaction is carried out in a traditional reactor vessel or vessels upstream of the distillation reactor to remove catalyst poisons in vessels which can easily be pulled off stream to change catalyst. The reaction may thus be carried out ahead of the distillation reactor until the forward reaction rate of $A+B \rightarrow C$ is about equalled by the reverse reaction rate of $C \rightarrow A+B$, i.e., until the reaction rate becomes substantially equilibrium limited. Then the equilibrium limited mixture consisting of A, B and C is introduced via line 10 to distillation column reactor 28. In any case, that is whether or not one or more traditional fixed bed or fluidized bed reactors are used upstream of distillation reactor 28, reactants A and B are introduced to distillation column reactor 28, the variable being whether or not some product C is formed ahead of distillation column reactor 28.

Because A and B are usually lighter than product C and have a higher relative volatility, they are vaporized more readily and flow upward in the distillation reactor as indicated by the upward pointing arrows 20. For purposes of illustration, it may be assumed that the trays in the column are sieve trays, i.e., trays with small holes punched in them. The drawing illustrates one method of contacting with the catalyst by locating the catalyst in the downcomers from the respective trays above feed tray 4. The heterogeneous catalyst is indicated by numeral 11.

Liquid flows across the trays and then down through the downcomer in contact with the heterogeneous catalyst. The catalyst increases the rate of the reaction $A+B \rightarrow C$ at the particular set of temperature and pressure conditions maintained throughout the column. The trays illustrated in the drawing are known in the fractionation art as single pass trays, with the liquid flowing essentially in only one direction across any given tray. As is well known in the fractionation art, countercurrent flow of liquid and vapor is established in the distillation column due to heat which is introduced to the lower part of the column and heat which is removed near the upper part of the column. In some instances, heat is removed or supplied at intermediate points to the column, but the same basic principles of heat balance apply. Also, the condition (enthalpy or heat content) of the feed introduced via line 10 will affect the amount of internal reflux prevailing near the feed zone, i.e., tray 4 in this instance.

In the drawing upward arrows 20 and downward arrows 20 schematically indicate internal reflux, that is, countercurrent liquid and vapor flow, throughout the distillation column. The vapors actually do flow upward through all of the respective trays 1 through 7. However, only a small amount of liquid actually flows through the tray (weepage). The great majority of the liquid flows across each tray and then down through the downcomer as is indicated by arrows 8. The vapors flowing upward in the distillation column and then bubbling through the holes in the trays substantially prevent the liquid from flowing downward through the tray itself. The feed is constantly fractionated as it moves from tray to tray primarily as a result of the vapor-liquid equilibrium resulting as the vapor flows through the liquid on each tray. Thus reactants A and B tend primarily to move upward and C primarily moves downward. C then collects in the bottoms of the column at 12. The purity of C depends on reflux rates established in the distillation column and the number of trays and tray spacing or the length (vertical height) of packing used if the column is filled with packing instead of using trays.

C (and in most cases some B) is withdrawn from the bottom of the column via line 13. A portion of the product stream is recycled via line 14 to reboiler 15. Heat, as for example in the form of steam, is supplied to reboiler 15 via line 16. The heat is used to generate vapors by reboiling the component C introduced to the reboiler via line 14. C may be completely vaporized or only partially vaporized and withdrawn from the reboiler via line 17. That portion which is not vaporized falls back as indicated by arrow 19 to the accumulated liquid in the bottom of the column as indicated by numeral 12. The vapor passes upward as indicated by arrow 18.

Referring now to the upper part of the column, a vapor stream which consists primarily of X and Y (and in most cases some excess B) is withdrawn via line 21. This vapor stream is condensed in overhead condenser 22, as for example by cooling water introduced via line 30 to overhead condenser 22. The condensed overhead is received by reflux drum 24, via line 27 and a reflux portion is introduced to the upper part of the column, in this instance at tray 7 via line 27. A net withdrawal of X and Y is made via line 26. X and Y may contain some component B which may be recovered by other processes not shown, for example by water washing.

Although the external reflux is shown as being introduced to only one position in the column, it is to be understood that there may be multiple points of reflux introduction or there may be no points of reflux introduction as, for example, in that situation where heat is removed by an internal coil placed in the upper part of the column. Similarly the vapors may be generated in the lower part of the column without any exterior reboiler as, for example, in the instance where a heating coil is placed in the lower part of the column. Also the reactants may be introduced together or separately at multiple locations in the distillation reactor so as to better take advantage of concentration gradients prevailing in the distillation reactor.

Referring again to the lower part of the column, C is withdrawn via line 40 and fed to distillation column reactor 58 at tray 74. Distillation column reactor 58 operates similar to column 28 in many respects, such as liquid flow across single path trays, internal reflux of vapor and liquid, overhead condensation and reflux, and reboiling at the bottom of the column.

However, as is shown in the drawing, the catalyst in column 58 is located in the lower part of the column. Liquid flows across the trays and in the lower part of the distillation column, that is, below the feed plate, and enters downcomers containing the same catalyst as is used in distillation column reactor 28 above the feed plate. The liquid flow across the trays is indicated by arrows 38. The catalyst in the lower part of column 58 speeds up the decomposition reaction of $C \rightarrow A+B$.

The reactions which are carried out in accordance with the process of the present invention are reversible reactions and the catalyst does not affect the position of equilibrium. Consequently, a good catalyst for the forward reaction will also accelerate the reverse reaction. Illustrative of this is the use of hydrochloric acid to facilitate esterification of an organic acid and also the hydrolysis of the corresponding ester. See Glasstone and Lewis, "Elements of Physical Chemistry," 2nd edition, 1960, page 644.

Thus, in distillation column reactor 58 the same catalyst which is used to accelerate the reaction $A+B \rightarrow C$ in column 28 is used in column 58 to speed up the kinetics of the reaction $C \rightarrow A+B$. However, in column 58 the catalyst is located primarily in the lower part of the column instead of above the feed zone as is the case in column 28. In column 58 the lower part of the column is relatively rich in C, as C is less volatile than the component A, which is ultimately desired to be recovered according to the process of the present invention.

As was previously mentioned, concentration profiles for the various constituents will exist for a given set of operating conditions in the distillation column reactor. The concentration profile for B determines the position at which component B is withdrawn. A stream rich in component B is withdrawn as a sidestream via line 83 according to the schematic flow sheet. Chemical B is recycled to distillation column reactor 28 as indicated by arrow 83a, joining the feed mixture of X, Y, and A to column 28. Alternatively, a stream rich in B may be withdrawn from column 58 via line 84 or via line 59 for recycle to column 28. One of the advantages of the process of the present invention is the flexibility of the process so that constituents of various relative volatiles may be handled.

In most instances it will be preferable to withdraw chemical B from the bottom of the column as indicated by arrow 59. In these instances it is preferable to react the great majority of chemical C introduced to column 58 before C reaches the bottom of the distillation column reactor so that stream 59, which is recycled as feed to distillation column reactor 28, is rich in component B.

In the lower part of the distillation column, chemical C is constantly being decomposed to form A and B. In the embodiment of the invention schematically illustrated in the drawing the decomposition of C is largely complete before it reaches the bottom of the distillation column. Liquid B collects in the bottom of the distillation column as indicated by the liquid labeled by numeral 42. B is withdrawn from the bottom via line 43 and passed via line 44 to reboiler 45. B is heated in the reboiler by a heat source such as stream introduced to the reboiler via line 46. B is withdrawn from the reboiler via line 47 and returned to the lower part of the distillation column. If B is completely vaporized in the reboiler, the vapors pass upward as indicated by arrow 48. Any portion of B which is not vaporized in the reboiler drops down as indicated by arrow 49. Thus, reboiler 45 is used as a means to introduce heat to the lower part of the distillation column reactor 58 so as to generate upward-flowing vapors. The upward-flowing vapors generated by heat source in the bottom of the column and the downward-flowing liquid reflux generated by removing heat at the upper part of the column result in the establishment of internal reflux throughout the column as is schematically illustrated by upward and downward arrows 50.

As the decomposition of C is accelerated by contact with the catalyst as indicated by the numeral 41 in the downcomer, A is constantly fractionated away and travels as a vapor upwardly in the column, as is indicated by the upward arrows 50. A leaves the column via line 51 and is condensed in overhead condenser 52 as the result of heat exchange with cooling water introduced to the condenser via line 60. The condensed overhead, which in many instances is essentially pure component A obtained as a result of the fractionation, is withdrawn from the reflux drum via line 55 and partially refluxed as indicated via line 57. The net recovered chemical A is withdrawn via line 56. A may and usually does contain some B which may be recovered by other processes not shown, for example by water washing or further distillation.

Although various specific embodiments of the invention have been described and shown, it is to be understood they are meant to be illustrative only and not limiting. Certain features may be changed without departing from the spirit or essence of the invention. It is apparent that the present invention has broad application to the separation of one or more chemical components from a mixture of chemicals using distillation column reactors. Accordingly, the invention is not to be construed as limited to the specific embodiments illustrated but only as defined in the appended claims.

What is claimed is:

1. A process for separating a tertiary olefin from a mixture of hydrocarbons which comprises:
(a) feeding the mixture and an alcohol to a first distillation column reactor containing a first heterogeneous catalyst effective to catalyze and thereby accelerate an equilibrium-limited reaction of the tertiary olefin with the alcohol to form an ether;
(b) contacting the tertiary olefin with the first heterogeneous catalyst contained in the first distillation column reactor and forming the ether by an equilibrium-limited reaction while simultaneously fractionating unreacted portions of the tertiary olefin away from the ether;
(c) removing the formed ether from the first distillation column reactor;
(d) feeding the ether to a second distillation column reactor containing a second heterogeneous catalyst effective to catalyze and thereby accelerate the equilibrium-limited reaction of the formed ether to the tertiary olefin;
(e) contacting the ether with the second heterogeneous catalyst contained in the second distillation column reactor and forming the tertiary olefin by an equilibrium-limited reaction while simultaneously fractionating unreacted portions of the ether away from the tertiary olefin; and
(f) removing the tertiary olefin from the second distillation column reactor.

2. A process in accordance with claim 1 wherein approximately the same temperature range employed in the first distillation column is also employed in the second distillation column.

3. A process in accordance with claim 1 wherein said mixture of chemicals is obtained by fractionating a $C_5$ hydrocarbon cut from a hydrocarbon stream.

4. A process in accordance with claim 1 wherein the reaction of the tertiary olefin to form the ether is equilibrium-limited to yields of between 2 and 90 mole percent of the ether (based on the moles of the tertiary olefin) at the temperature maintained in the first distillation column reactor at the feed zone.

5. A process in accordance with claim 1 wherein said mixture of chemicals is obtained by fractionating a $C_4$ hydrocarbon cut from a hydrocarbon stream.

6. A process for separating a tertiary olefin from a mixture of hydrocarbons including linear olefins and paraffins which comprises:
(a) feeding the mixture and an alcohol to a first distillation column reactor containing a first heterogeneous catalyst effective to catalyze a reaction of the tertiary olefin with the alcohol to form an ether;
(b) contacting the tertiary olefin with the first heterogeneous catalyst contained in the first distillation column reactor and forming the ether while simultaneously fractionating unreacted portions of the tertiary olefin away from the ether;

(c) removing the ether from a lower part of the first distillation column reactor;

(d) feeding the ether to a second distillation column reactor containing a second heterogeneous catalyst effective to catalyze a decomposition reaction of the ether to form the tertiary olefin;

(e) contacting the second chemical with the second heterogeneous catalyst contained in the second distillation column reactor and forming the tertiary olefin while simultaneously fractionating unreacted portions of the alcohol away from the first chemical; and (f) removing the tertiary olefin from an upper part of the second distillation column reactor.

7. A process in accordance with claim 1 wherein the first heterogeneous catalyst and the second heterogeneous catalyst are a sulfonated resin effective to catalyze both the reaction of tertiary olefin with an alcohol to form a tertiary ether and effective to catalyze the equilibrium-limited reaction of tertiary ether to form said tertiary olefin and said alcohol.

References Cited

UNITED STATES PATENTS

| | | | |
|---|---|---|---|
| 3,170,000 | 2/1965 | Verdol | 260—677 |
| 3,121,124 | 2/1964 | Verdol | 260—677 |
| 3,366,457 | 1/1968 | Hunter | 23—263 |
| 3,241,926 | 3/1966 | Parker et al. | 23—283 |
| 2,370,810 | 3/1945 | Morrell et al. | 260—677 |
| 3,250,820 | 5/1966 | Duthie | 260—677 |
| 2,392,740 | 1/1946 | Horeczy et al. | 260—677 |

DELBERT E. GANTZ, Primary Examiner

J. M. NELSON, Assistant Examiner

U.S. Cl. X.R.

203—28